United States Patent Office 3,469,132
Patented Sept. 23, 1969

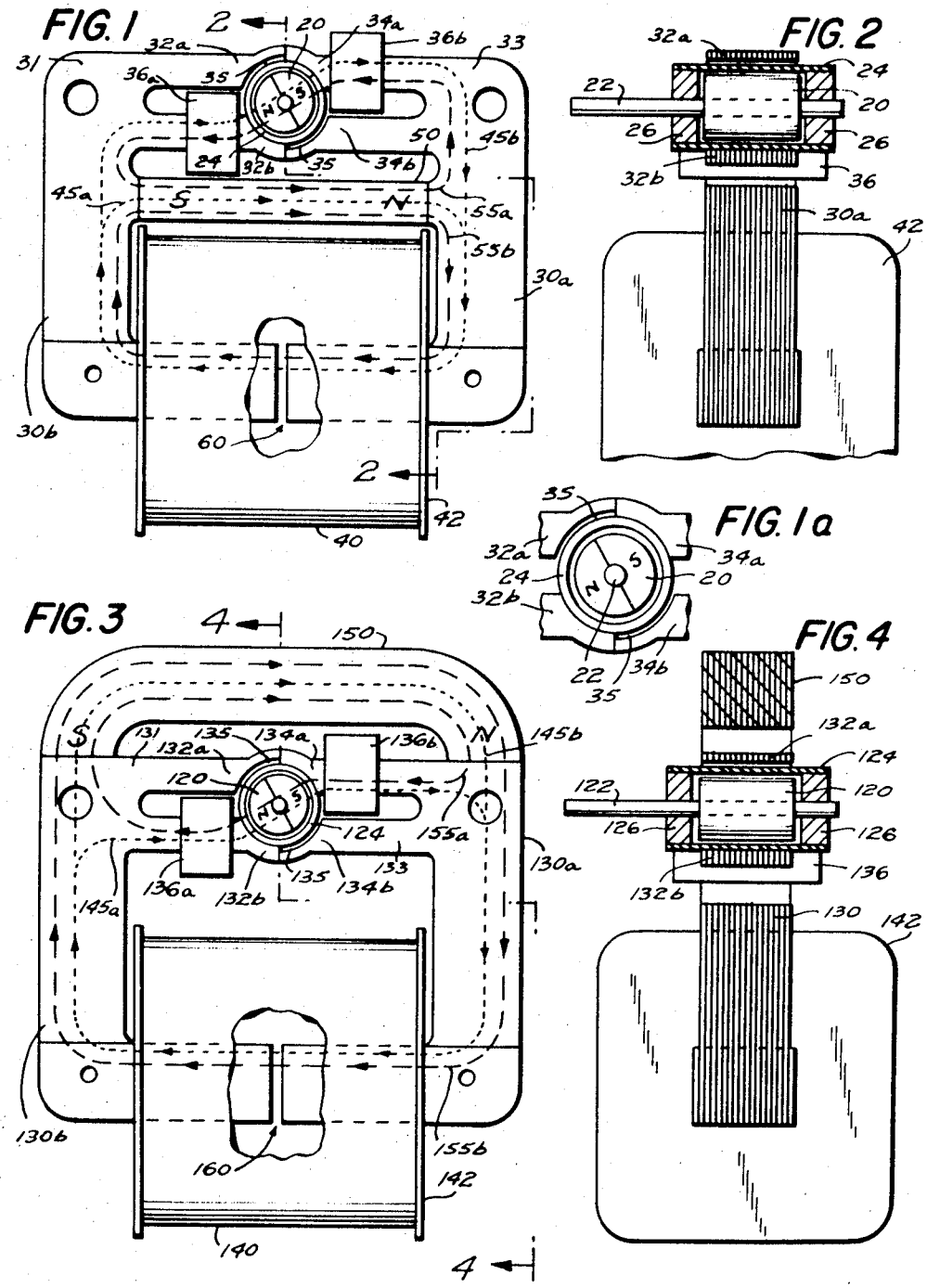

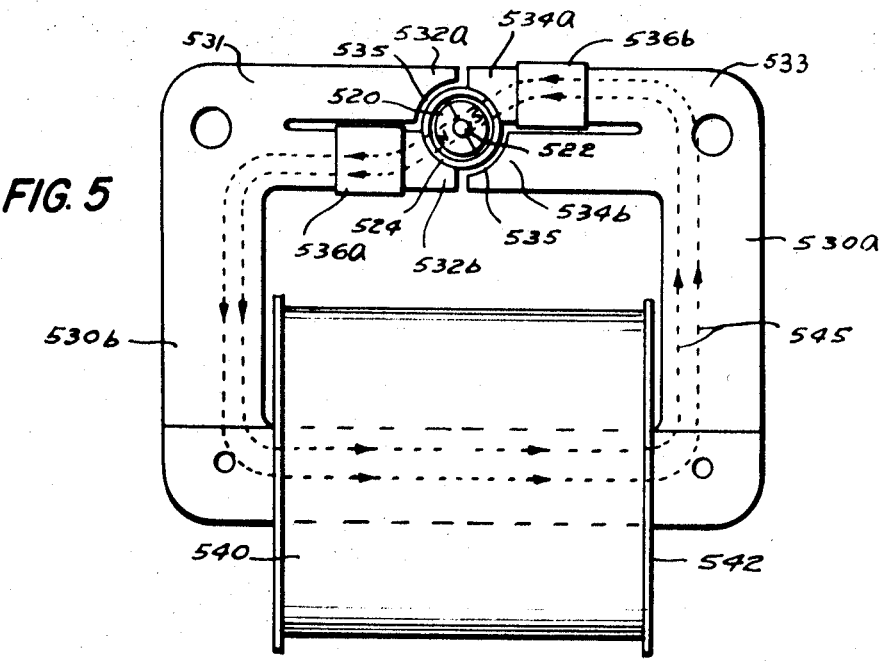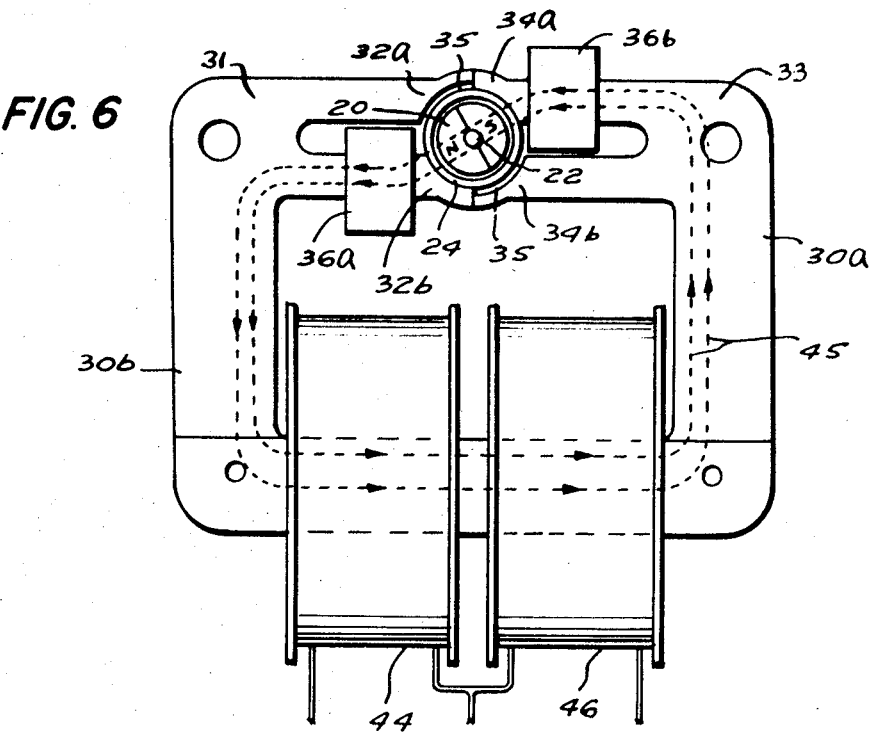

3,469,132
SYNCHRONOUS MOTOR
Arthur W. Haydon, Huntington, Edward Herbert III,
Beacon Falls, and William D. Riggs, Woodbury, Conn.,
assignors to Tri-tech, Inc., a corporation of Connecticut
Original application Sept. 8, 1964, Ser. No. 394,669.
Divided and this application May 12, 1966, Ser. No.
549,698
Int. Cl. H02k 21/14
U.S. Cl. 310—163                              9 Claims

ABSTRACT OF THE DISCLOSURE

A synchronous motor having a pair of stator poles and a cylindrical rotor which is permanently magnetized in opposite directions to provide only two rotor poles. The rotor is comprised of a body of magnetic material having an energy product of at least about $3.0 \times 10^6$ gauss-oersteds. The axial length of the rotor is greater than its diameter, and the rotor exhibits a high torque-to-inertia ratio. In several embodiments the rotor accelerates to synchronous speed in the prescribed direction in the first half cycle of the applied waveform of the proper polarity. Each of the stator poles is divided into two discrete branches of dissimilar length to provide a non-uniform air gap, and one of the branches on each pole includes a shading ring. The motor also may be operated as a three wire stepper motor in which each pair of applied pulses rotates the rotor through an angle of 360 electrical degrees.

---

The present application is a division of our co-pending patent application, Ser. No. 394,669, filed Sept. 8, 1964, for "Electric Rotating Machine," now abandoned in favor of U.S. application Ser. No. 595,286, filed Oct. 14, 1966, which issued on Feb. 20, 1968, as Patent 3,370,189.

An important and advantageous feature of the present invention is the provision, in electric rotating machines such as electric motors, of a permanently-magnetized rotor member of novel design and construction which greatly improves certain important motor performance characteristics. The improved rotor is well suited for use in A.C. synchronous motors, stepper motors, "brushless" and self-commutating D.C. motors, and other electric rotating machines constructed in accordance with the invention. In particular, by the utilization of a rotor member comprised of permanent-magnet material in the form of a substantially solid cylinder having an axial length greater than its diameter, the rotational moment of inertia of the rotor member is markedly reduced with a corresponding increase in the torque/inertia ratio which enables the motor to respond extremely quickly upon energization. In addition, a new and improved stator pole structure is disclosed which ensures reliable and unidirectional self-starting characteristics for the various motor embodiments under substantially all conditions of operation.

In one important embodiment of the present invention, the motor design is operated as an A.C. synchronous motor, with the field coil energized by a source of A.C. potential and the permanent-magnet rotor member exposed to an alternating magnetic field provided by the stator flux. In the starting of prior art motors it often takes at least several full cycles after energization of the field coil for the motors to reach synchronous speed. However, in the present motor design, principally by reason of the improved low-inertia rotor configuration, the high energy product of the magnetized material used in its construction, as well as certain particular characteristics of the stator structure, the motor possesses an extraordinarily high torque/inertia ratio which enables it to lock into synchronism extremely quickly. In fact, for applied waveforms having frequencies on the order of 60 cycles per second, the motor will, in most embodiments, accelerate so rapidly from the quiescent position that it reaches full synchronous speed during the first cycle of the applied voltage. Unidirectional self-starting characteristics are also achieved in the motor of the present design through the use of a unique non-uniform air gap configuration between the rotor member and stator structure, coupled with a particular arrangement of stator-pole shading rings. Furthermore, on stopping, the motor comes to rest very rapidly when the power is removed, usually within but one revolution of the rotor, due to the low-inertia design of the rotor member, the electrodynamic braking provided by the shading rings, and, in those motor embodiments in which a bias magnet is employed, the locking action produced by the interaction of the bias flux with that from the rotor member.

By reason of the improved rotor design and other innovations in A.C. synchronous motor design provided in advantageous embodiments of the present invention, it becomes practical for the first time to obtain power efficiencies of well over 10% for small motors used for timing and similar purposes. For example, in an actual embodiment of an A.C. synchronous motor constructed in accordance with these teachings, a torque output of over 150 in.-oz. at 1 r.p.m. was obtained with less than 1 watt of input power. This is to be contrasted with timing motors of conventional design which often have efficiencies of less than 1% and ordinarily require 2 to 3 watts of input power to deliver a torque of between 5 to 50 in.-oz. at the same speed. As can be readily appreciated, the higher efficiency and torque output characteristics of A.C. synchronous motors of the present design allow motor size and weight to be significantly reduced, and the cooler running operation permits motor maintenance and lubrication problems to be minimized.

In other important embodiments the rotating machine of the present invention may be operated, as disclosed in the aforesaid pending application, Ser. No. 394,669, as a two-wire or three-wire stepper motor, a "brushless" D.C. motor energized from a source of D.C. potential through an inverter circuit, or as a self-commutating D.C. motor activated by unipolar pulses of electric potential. All of the disclosed motor embodiments utilize certain constructional features of the novel rotor and stator designs disclosed herein, and each motor embodiment exhibits markedly improved performance and operating characteristics when compared to conventional electric rotating machines heretofore known to the art.

It is therefore a principal object of the present invention to provide an electrical rotating machine which has certain important innovations and improvements in rotor and stator structure design and which is suitable for a wide variety of advantageous applications, including A.C. synchronous, stepper, and "brushless" D.C. motor operation.

It is another object of the present invention to provide an A.C. synchronous motor of new and improved design having very high operating efficiency as well as excellent starting characteristics, including high acceleration and reliable unidirectional self-starting.

The foregoing and other objectives, features, and advantages of the invention will be more readily understood upon consideration of the following detailed description of the invention, taken in conjunction with the accompanying drawings.

FIG. 1 is a front view, partially fragmentary, of a first illustrative embodiment of the present invention showing an electric rotating machine suitable for use as either a two-wire stepper or "brushless" D.C. motor, FIG. 1a is an enlarged view of a portion of FIG. 1, FIG. 2 is a side sectional view, taken along the line 2—2 of FIG. 1, showing details of the machine's rotor assembly, FIG. 3 is a front view, partially fragmentary, of a second illustrative embodiment of the present invention, FIG. 4 is a side sectional view taken along the line 4—4 of FIG. 3, FIG. 5 is a front view of a modification of the first illustrative embodiment of the invention shown in FIGS. 1 and 2 adapted for use as an A.C. synchronous motor, and FIG. 6 is a front view of a further modification of the embodiment of FIGS. 1 and 2 adapted for use as a three-wire stepper motor.

Referring now to the figures, FIGS. 1, 1a, and 2 show an illustrative embodiment of the invention suitable for use as either a two-wire stepper or "brushless" D.C. motor. In this form, the motor comprises a generally C-shaped stator frame formed of two members 30a, 30b which are made from laminated stampings of suitable metallic material, for example, low carbon or mild silicon steel. The laminations are secured together in the conventional manner by suitable fastening means such as eyelet rivets. Encircling the central portion of the stator frame is a bobbin 42 on which is wound a two-terminal field coil 40 for energization from a source of electric potential as will be hereinafter explained.

The left-hand stator frame member 30b terminates at the distal end from the field coil 40 in a pole 31 which is bifurcated into two branches 32a and 32b. Similarly, the right-hand stator frame member 30a terminates in a pole 33 split into branches 34a and 34b. Centered inside the generally circular arc described by the contiguous faces of the poles 31 and 33 is the rotor assembly 20 which is rotatably supported by a shaft 22 carried on bearings 26 contained within a rotor housing 24 of brass or other suitable nonferrous material.

In a preferred embodiment the rotor assembly comprises a relatively slender cylinder of magnetized material possessing a high B–H energy product, i.e., high residual flux and high coercivity, as well as other good magnetic characteristics. High coercivity is an especially desirable property for a permanent magnet material for use in the rotor assembly of the present design in view of the alternating magnetic field and other de-magnetizing influences to which the rotor magnet is exposed both in operation and at rest. Since the magnitude of the rotor flux has an important effect on the resulting torque output of the motor, it is desirable that the magnet material selected for the rotor also possess high residual induction.

One new type of magnet material which meets the above requirements for a rotor magnet material is a composition of 77% platinum and 23% cobalt by weight which is manufactured by The Hamilton Watch Co. of Lancaster, Pa., and the Arnold Engineering Co. of Marengo, Ill. Typical magnetic characteristics of this new magnet material are tabulated below:

Residual Induction, $B_r$: 6,400 gauss
Coercive Force, $H_c$: 4,300 oersteds
Maximum Energy Product, $B_d\text{-}H_d$: $9.0 \times 10^6$ gauss-oersteds.

As the energy product of this new platinum-cobalt material is from three to nine times greater than those of conventional rotor magnet materials, the rotor flux in the stator-rotor air gap, and hence the torque of the motor, are increased proportionally when a rotor of this material is substituted.

Another magnet material which we have found to be especially advantageous is a straight-line oriented barium ferrite material having an energy product on the order of $3.0 \times 10^6$ gauss-oersteds along the axis of orientation. This anisotropic ferrite material, which is marketed by Indiana General Corp., Valparaiso, Ind., under the trademark "Indox VI" and by Stackpole Carbon Co. of St. Marys, Pa., under the trademark "Ceramagnet O," may be readily adapted for use in the two-pole rotor assemblies of the present motors by making the axis of magnetic orientation coincident with a diameter of the cylindrical rotor.

The use of a high energy-product rotor material, coupled with certain other novel design features of the present invention described below, results in a motor having extremely fast acceleration at starting. This in turn means that the motor possesses a fast response time and a capability of reaching synchronous speed very rapidly—characteristics which are of important advantage in motors designed for use in pulsed and synchronous applications.

In order to further improve the acceleration performance of the motor during starting, the rotor configuration is preferably arranged such that the axial dimension of the rotor is greater than its diameter. This slender cylinder design markedly reduces the rotational moment of inertia of the rotor 20 about its shaft 22 with a corresponding increase in the motor's torque/inertia ratio during starting operation.

As indicated schematically in FIGS. 1 and 1a, a pair of opposite-polarity magnetic poles are induced in the rotor magnet material. The shape of the two pole regions is such as to divide the rotor 20 into two semi-cylindrical magnetized sections extending the length of the rotor. When the rotor magnet is comprised of a magnetic material of high coercivity, the two regions of opposite magnetic polarity may be placed very close to each other without deleterious effect, and therefore each pole may extend over a relatively wide arc (substantially 180°) of the rotor periphery.

In order to obtain a unidirectional starting characteristic, this exemplary motor embodiment is provided with a pair of shading rings 36a, 36b. Each of the shading rings encircles one of the two branches of its respective bifurcated stator poles 31, 33. Thus, shading ring 36a encompasses the lower branch 32b of the left-hand pole 31, and shading ring 36b embraces the upper branch 34a of the right-hand pole 33.

This arrangement, wherein the pole branches which are shaded are diametrically opposed across the rotor member 20, serves to shift the direction of the stator flux passing through the rotor-stator air gap 35 from the unshaded branches 32a, 34b towards the shaded branches 32b, 34a as the flux builds up during starting. Accordingly, this shift in direction due to the delayed build-up of stator flux in the shaded portions of the stator poles will impart a unidirectional starting characteristic to the motor in a manner well-understood by those conversant with the art. Furthermore, on de-energization of the motor, these same shading rings 36a and 36b assist in bringing the motor to a rapid stop through the electrodynamic braking action produced by the currents induced therein as the rotor revolves.

By making the air gap 35 between the rotor periphery and the stator poles of non-uniform dimension, wherein the spacing from the rotor to the faces of the shaded poles 32b, 34a is significantly smaller than that to the faces of the unshaded poles 32a, 34b, the rotor will consistently stop, upon de-energization of the motor, at the quiescent position shown. That is to say, the paths of minimum reluctance for the rotor flux, as a result of this non-uniform air gap configuration, are such that the rotor will consistently assume a quiescent position wherein the respective centers of the magnetized rotor pole regions will be situated directly underneath the face of the shaded, rather than the unshaded, pole branches. Accordingly, upon starting, the stator flux, which is initially directed along a line passing through the unshaded pole branches 32a, 34b, will have a component in the tangential direction relative to magnetic poles of the rotor, and rotational movement of the rotor in the desired direction will occur.

On the other hand, in the absence of a non-uniform air gap spacing of the nature specified, it would be possible for the rotor to assume a quiescent position wherein the center of its pole regions were aligned directly underneath the faces of the unshaded poles (i.e., a rotor position shifted 90° from that shown in FIG. 1) in such case the rotor would start, but would rotate in the reverse, or undesired, direction. Hence the presence of shading rings 36a and 36b alone would not ensure reliable unidirectional starting of the motor. It is only through the cooperative combination of the shading rings and the low reluctance paths provided by the non-uniform air gap construction described, whereby the rotor consistently assumes a quiescent position favorable to starting, that a reliable unidirectional starting characteristic is achieved.

Continuing now with the description of the particular motor embodiment shown in FIGS. 1, 1a, and 2, which is designed for use as a two-wire stepper motor, there is located between the field coil assembly 40 and the rotor assembly 20 of the motor a permanent magnet member 50 which bridges the space between the respective leg members 30a, 30b of the stator frame. This member 50, which may be comprised of any suitable permanent magnet material, for example, high carbon or Alnico steel, generates a magnetic "bias" flux which flows through the magnetic circuit of the motor along two principal flux paths whose directions are indicated schematically by the dashed lines 55a and 55b in FIG. 1.

One portion of the bias flux flows along a path 55b from the N (north) pole of the bar magnet 50, first downwardly in the leg portion 30a of the stator frame, horizontally through the central portion of the stator frame which contains an air gap 60 for limiting the amount of flux following this path, and then upwardly through the opposite leg 30b of the stator frame to return to the S (south) pole of the magnet. The second and greater portion of the bias flux flows along a path 55a from the N pole of the magnet 50, upwardly through the leg 30a of the stator frame into the stator pole 33, horizontally across the air gap 35 into the rotor 20, diametrically through the body of the rotor and across the air gap on the other side into the opposite stator ple 31, and then downwardly through the leg 30b to return to the S pole of the magnet.

In the quiescent condition, that is, with the field coil 40 of the motor de-energized, the direction of the flux from the magnet 50 which passes through the rotor 20 is such that the rotor 20 assumes the alignment shown in FIG. 1. In this orientation the S region of the rotor is attracted by and aligned opposite the right-hand stator pole 33 which is magnetically connected to the N pole of magnet 50; correspondingly, the N pole of the rotor is aligned opposite the lefthand stator pole 31 which is linked to the S pole of the bias magnet. Each and every time that the field coil is de-energized, and the motor returns to the quiescent condition, the rotor member 20 assumes this same orientation. That is, each of the polarized N and S regions on the rotor is aligned opposite the respective stator pole which is of different magnetic polarity by reason of its linkage to the bias magnet member 50.

Upon energizing of the field coil 40 with an electrical pulse of predetermined polarity and amplitude, a second magnetic flux is produced in the magnetic circuit of the motor which flows through the rotor member 20 in a direction directly opposite that of the bias flux produced by the permanent magnet member 50. For the assumed magnetic polarities shown in FIG. 1, the polarity of the applied pulse would be such so as to make the left-hand side of the field coil bobbin 42 a north pole, and the right-hand side a south pole. Thus, as indicated schematically by the dotted lines 45a and 45b, the field coil flux would flow from the north or left side of the field coil 40 dividing between two principal paths in the motor's magnetic circuit. A substantial portion of the field coil flux flowing upwardly in the leg member 30b of the stator frame would follow path 45a, passing through the bias magnet member 50, and then downwardly through the stator leg 30a returning to the right or south side of the field coil. The remainder of the field coil flux would continue along path 45b, flowing up into the stator pole 31, across the stator-rotor air gap 35 and diametrically through the body of the rotor 20, next across the air gap on the opposite side of the rotor into the stator pole 33, and then returning to the south side of the coil via leg 30a.

The amplitude of the field coil flux 45b flowing in the stator poles 31, 33 is chosen so as to be sufficiently large to momentarily cancel out the influence in the air gap 35 of the bias flux 55a from the permanent magnet 50, and produce a net magnetic field in the opposite direction through the rotor member 20. This reversal in direction of the composite stator flux acting on the rotor member 20 produces forces of magnetic attraction and repulsion on the magnetized pole regions of the rotor which cause this member to rotate 180° in space. That is, the respective N and S regions on the rotor effectively exchange positions as the rotor member turns to line up in accordance with the reversal in the magnetic flux flow through the stator pole pieces 31 and 33.

So long as the pulse of electrical energy applied to the field coil 40 is of sufficient amplitude to produce a composite flux through the rotor 20 in a direction opposite that of the bias flux, the rotor will remain in this new position, displaced 180° from its original or quiescent orientation. However, upon termination of the applied pulse and de-energization of the field coil, the flux flowing through the magnetic circuit of the motor reverts to that provided by the permanent magnet member 50 alone. Since the flow of the bias flux through the rotor member 20 is oppositely directed from that produced by the field coil, a second reversal now occurs in the net flux flow through the air gap 35, and the rotor revolves an additional 180° to assume an equilibrium orientation with respect to the changed direction of the stator pole flux.

By reason of the unidirectional starting characteristic provided by the shading rings 36a, 36b and the design of the branch terminations of the stator poles 31 and 33 to provide a non-uniform configuration of the air gap 35, the rotational advance of the rotor member 20 upon each reversal of flux will always be in the same direction, and thus additive. In a two-pole rotor of the type shown in the figures, this second advance of the rotor, due to the reversal of the flux in the air gap 35 which occurs upon the termination of the energizing pulse to the field coil 40 completes a full cycle of revolution and returns the rotor to the quiescent position it occupied just prior to the application of the energizing pulse. In other words, the rotor member turns 180° when the energizing current is applied to the field coil 40, and a further 180° when the current is removed. The rotor thus rotates a full 360° upon the application of each pulse.

FIGS. 3 and 4 show a second illustrative embodiment of the present invention which is a modification of the embodiment of FIGS. 1–2, wherein the bias magnet member 150 has been moved from its position between the coil assembly 140 and the rotor assembly 120 and placed outside the stator frame of the motor. Otherwise this embodiment is identical in all respects to that shown in FIGS. 1–2, and corresponding elements in this latter embodiment bear the same reference numerals increased by 100. It is to be noted that, in this modified embodiment, while the permanent magnet member 150 is located external to the stator frame, the respective flux paths for the field coil (145a, 145b) and the permanent magnet (155a, 155b) remain in parallel with each other throughout the major portion of the motor's magnetic circuit with the exception of the oppositely-directed flux lines passing through the stator pole pieces 131, 133, the stator-rotor air gap 135, and the rotor assembly 120.

FIG. 5 shows a modification of the embodiment shown in FIGS. 1–2 adapted for A.C. synchronous motor operation. In this particular mode of operation the bias magnet member is not present and the field coil 540 is energized from a suitable source of alternating (rather than unipolar) electric potential. The alternating magnetic flux lines 545 generated in the stator structure 530a, 530b by the energization of the field coil 540 act on the rotor assembly 520 situated between the stator poles 531, 533 to provide rotation of the rotor in accordance with conventional A.C. synchronous techniques. The combination of the improved slender cylinder rotor design, together with the shading rings 536a, 536b and the non-uniform air gap spacing 535 present between the rotor assembly 520 and the respective bifurcated branches of the stator poles 531, 533, cooperate to provide a highly efficient motor construction which has reliable and undirectional self-starting characteristics. As stated previously, the resultant high torque and low inertia of the rotor enables it to lock into synchronism extremely quickly upon starting. Moreover, the stopping action of the rotor, upon de-energization of the field coil 540, is almost instantaneous because of the low inertia of the rotor assembly 520.

FIG. 6 illustrates another modification of the embodiment shown in FIGS. 1–2 adapted for use as a three-wire stepper motor. In this mode of operation, two separate field coils 44, 46 (or alternatively, a single center-tapped coil) are provided in place of the single two-terminal coil shown in the previous embodiments, and the bias magnet member is again not present. The field coils 44, 46 are energized individually in alternate sequence with pulses of electric potential by means of suitable external logic switching circuitry (not shown, but conventional). The flux generated upon the energization of either coil flows through the stator frame pieces 30a, 30b and interacts with the rotor member 20 situated between the stator pole pieces 31, 33. A pulse applied, for example, to coil 44 produces flux lines 45 flowing in a given direction through the rotor member 20 and causes a 180° rotational advance. A following pulse is then applied to coil 46 in a manner so as to produce magnetic flux in the opposite direction between the stator poles 31, 33, thus causing a further 180° advance of the rotor member. This reversal in direction of the field coil flux on successive pulses may be readily achieved with the use of a suitable switching circuit connected to a source of D.C. potential. Thus, each pair of pulses would produce a full 360° rotation of the rotor member 20. This operation is to be contrasted with conventional three-terminal steppers wherein two or more full cycles of the applied waveform are required to produce a complete revolution of the rotor member.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An electrical rotating machine comprising a stator structure of magnetic material terminating in at least one pair of oppositely-disposed stator poles, a field coil surrounding a portion of said stator and energized with electrical potential for generating a magnetic flux in said stator, and a permanent-magnet rotor member of cylindrical configuration having at least one pair of poles of opposite magnetic polarity thereon, said rotor member being rotatably supported in the path of said stator flux and separated from each pole of said stator by an air gap; said motor being characterized in that said rotor is comprised of a material having an energy product of at least about $3.0 \times 10^6$ gauss-oersteds and that there is a substantial variation in the size of said air gap along the pitch face of each of said stator poles, said variation in air gap size providing said motor with a preferred quiescent stopping position for said rotor member when said field coil is de-energized wherein the poles of said rotor member are displaced from a position directly in line with the direction of said stator flux through said air gap when said field coil is energized, thereby to provide said machine with a reliable self-starting characteristic.

2. The electrical rotating machine set forth in claim 1 further characterized in that shading means are provided in said stator structure to delay momentarily the changes of stator flux in a portion of said stator poles when said field coil is energized, thereby to provide said machine with a reliable and unidirectional self-starting characteristic.

3. An electrical rotating machine of the type having a stator structure of magnetic material terminating in at least one pair of oppositely-disposed stator poles separated by an intervening air gap, a field coil encircling a portion of said stator and generating magnetic flux in said stator when energized from a source of electrical potential, and a permanent-magnet rotor member having at least one pair of poles thereon of opposite magnetic polarity and rotatably mounted in the air gap between the poles of said stator structure in the path of a principal portion of said stator flux; characterized in that said rotor member is comprised of a substantially solid cylinder of magnetized, high energy product barium ferrite material having an axial length greater than its diameter, whereby upon energization of said field coil the resultant combination of low rotational moment of inertia and high magnetic induction of said rotor member produces a high torque/inertia ratio and permits said machine to accelerate from rest very quickly.

4. An electrical rotating machine of the type having a stator structure of magnetic material terminating in at least one pair of oppositely-disposed stator poles separated by an intervening air gap, a field coil encircling a portion of said stator and generating magnetic flux in said stator when energized from a source of electrical potential, and a permanent-magnet rotor member having at least one pair of poles thereon of opposite magnetic polarity and rotatably mounted in the air gap between the poles of said stator structure in the path of a principal portion of said stator flux; characterized in that said rotor member is comprised of a substantially solid cylinder of magnetized, high energy product material having an axial length greater than its diameter, whereby upon energization of said field coil the resultant combination of low rotational moment of inertia and high magnetic induction of said rotor member produces a high torque/inertia ratio and permits said machine to accelerate from rest very quickly, said magnetized material in said rotor member being comprised of an isotropic alloy of 77% platinum and 23% cobalt by weight having an energy product on the order of $9.0 \times 10^6$ gauss-oersteds.

5. An electrical rotating machine of the type having a stator structure of magnetic material terminating in at least one pair of oppositely-disposed stator poles separated by an intervening air gap, a field coil encircling a portion of said stator and generating magnetic flux in said stator when energized from a source of electrical potential, and a permanent-magnet rotor member having at least one pair of poles thereon of opposite magnetic polarity and rotatably mounted in the air gap between the poles of said stator structure in the path of a principal portion of said stator flux; characterized in that said rotor member is comprised of a substantially solid cylinder of magnetized, high energy product material having an axial length greater than its diameter, whereby upon energization of said field coil the resultant combination of low rotational moment of inertia and high magnetic induction of said rotor member produces a high torque/inertia ratio and permits said machine to accelerate from rest very quickly, said rotor member having but a single pair of rotor poles, said magnetized material being an anisotropic barium ferrite having an energy product on the order of $3.0 \times 10^6$ gauss-oersteds along the axis of magnetic orientation, said axis coinciding with a diameter of said rotor member.

6. An electrical rotating machine of the type having a stator structure of magnetic material terminating in at least one pair of oppositely-disposed stator poles separated by an intervening air gap, a field coil encircling a portion of said stator and generating magnetic flux in said stator when energized from a source of electrical potential, and a permanent-magnet rotor member having at least one pair of poles thereon of opposite magnetic polarity and rotatably mounted in the air gap between the poles of said stator structure in the path of a principal portion of said stator flux; characterized in that said rotor member is comprised of a substantially solid cylinder of magnetized, high energy product material having an axial length greater than its diameter, whereby upon energization of said field coil the resultant combination of low rotational moment of inertia and high magnetic induction of said rotor member produces a high torque/inertia ratio and permits said machine to accelerate from rest very quickly, said machine being operated as a three-wire stepper motor with said field coil being energized by pulses of electrical potential to produce flux in said stator structure of alternating polarity, whereby said rotor member rotates 360 electrical degrees for each pair of applied pulses.

7. An electrical rotating machine according to claim 3 wherein the machine is operated as a synchronous motor energized from a source of alternating electrical potential having a frequency on the order of 60 cycles per second, and the torque/inertia ratio of the motor at starting is sufficiently high such that the motor accelerates to synchronous speed in the first half cycle of the applied alternating waveform which produces stator flux opposing the flux of the rotor poles.

8. An electrical rotating machine of the type having a stator structure of magnetic material terminating in at least one pair of oppositely-disposed stator poles separated by an intervening air gap, a field coil encircling a portion of said stator and generating magnetic flux in said stator when energized with electrical potential, and a permanent-magnet rotor member of cylindrical form rotatably mounted in said air gap in the path of said stator flux and having at least one pair of magnetized poles thereon of opposite magnetic polarity; characterized in that said rotor is comprised of a material having an energy product of at least about $3.0 \times 10^6$ gauss-oersteds and that each of said stator poles is divided into at least two branches of dissimilar length, the longer branch extending closer to said cylindrical rotor member than the other and similar branches of said respective poles being diametrically opposed across said rotor, and a shading ring is disposed about each of said longer branches, whereby said shading rings and the resultant variation in air gap spacing across the pitch face of said stator poles due to the dissimilarity in branch lengths cooperate to provide said machine with a reliable and unidirectional self-starting characteristic.

9. An electrical rotating machine comprising a stator structure of magnetic material terminating in a pair of oppositely-disposed stator poles separated by an intervening air gap, a field coil encircling a portion of said stator and generating magnetic flux in said stator when said field coil is energized with electrical potential, permanent-magnet rotor member having at least one pair of magnetized poles thereon of opposite magnetic polarity and rotatably mounted in the air gap between the poles of said stator structure in the path of said stator flux; characterized in that said rotor member is in the form of a substantially solid cylinder having an axial length greater than its diameter and comprised of a magnetized high energy product material, said high energy product being at least about $3.0 \times 10^6$ gauss-oersteds, each of said stator poles is divided into at least two branches of dissimilar length to produce a variation in the air gap spacing across the pitch face of each of said stator poles, and a shading ring is disposed about each of the respectively longer branches of said stator poles, whereby a high torque/inertia ratio, together with a reliable and unidirectional self-starting characteristic, are achieved in said machine.

References Cited

UNITED STATES PATENTS

| 2,525,456 | 10/1950 | Merrill | 310—156 |
| 2,897,384 | 7/1959 | Müller | 310—156 |
| 3,157,809 | 11/1964 | Bekey | 310—156 |
| 3,181,019 | 4/1965 | Pfister et al. | 310—156 |
| 3,317,766 | 5/1964 | Bensa | 310—156 |
| 2,131,436 | 9/1938 | Howell | 310—163 |
| 3,142,774 | 8/1964 | Lundin | 310—163 |

MILTON O. HIRSHFIELD, Primary Examiner

L. L. SMITH, Assistant Examiner

U.S. Cl. X.R.

310—156